(12) United States Patent
Hong et al.

(10) Patent No.: US 12,242,564 B2
(45) Date of Patent: Mar. 4, 2025

(54) METHOD AND SYSTEM FOR PERFORMING MULTI-DEVICE BASED INFERENCE FOR LARGE LANGUAGE MODEL

(71) Applicant: HyperAccel Co., Ltd., Hwaseong-si (KR)

(72) Inventors: Seongmin Hong, Hwaseong-si (KR); Junsoo Kim, Hwaseong-si (KR); Gyubin Choi, Hwaseong-si (KR)

(73) Assignee: HyperAccel Co., Ltd., Hwaseong-si (KR)

( * ) Notice: Subject to any disclaimer, the term of this patent is extended or adjusted under 35 U.S.C. 154(b) by 0 days.

(21) Appl. No.: 18/740,201

(22) Filed: Jun. 11, 2024

(65) Prior Publication Data

US 2024/0411835 A1 Dec. 12, 2024

(30) Foreign Application Priority Data

Jun. 12, 2023 (KR) .......................... 10-2023-0074834

(51) Int. Cl.
*G06F 17/16* (2006.01)
(52) U.S. Cl.
CPC .................................. *G06F 17/16* (2013.01)
(58) Field of Classification Search
CPC ....................................................... G06F 17/16
See application file for complete search history.

(56) References Cited

U.S. PATENT DOCUMENTS

| | | | |
|---|---|---|---|
| 2020/0117700 A1 | 4/2020 | Chatterjee et al. | |
| 2023/0161621 A1* | 5/2023 | Abts | G06F 15/163 |
| | | | 709/224 |

FOREIGN PATENT DOCUMENTS

| | | |
|---|---|---|
| KR | 10-2017-0140085 | 9/2018 |
| KR | 10-2020-0062743 | 10/2020 |
| KR | 10-2021-7015589 | 6/2021 |
| KR | 10-2021-0089247 | 7/2021 |
| KR | 10-2022-0041224 | 3/2022 |

OTHER PUBLICATIONS

Office Action mailed Aug. 30, 2023, issued in corresponding Korean Application No. 10-2023-0074834, filed Jun. 12, 2023, 8 pages.
Decision to Grant a Patent mailed Nov. 24, 2023, issued in corresponding Korean Application No. 10-2023-0074834, filed Jun. 12, 2023, 6 pages.

* cited by examiner

*Primary Examiner* — Michael D. Yaary
(74) *Attorney, Agent, or Firm* — Christensen O'Connor Johnson Kindness PLLC

(57) ABSTRACT

Provided is a method and system for performing multi-device-based inference for a large language model. A multi-device-based inference performance system may include a plurality of devices configured to map to partitions that separate a large language model (LLM) according to an intra-layer parallelism method. Here, each of the plurality of devices may be implemented to synchronize data by sharing a sub-result of matrix multiplication on the data with another device of the plurality of devices while the matrix multiplication is being performed.

12 Claims, 6 Drawing Sheets

METHOD AND SYSTEM FOR PERFORMING MULTI-DEVICE BASED INFERENCE FOR LARGE LANGUAGE MODEL

CROSS-REFERENCE TO RELATED APPLICATION

This application claims the priority benefit of Korean Patent Application No. 10-2023-0074834, filed on Jun. 12, 2023, in the Korean Intellectual Property Office, the disclosure of which is incorporated herein by reference.

BACKGROUND

1. Field of the Invention

Example embodiments relate to a method and system for performing multi-device-based inference for a large language model.

2. Description of the Related Art

A large language model (LLM) refers to a model that calculates probability distribution of natural language sentences using an artificial neural network and is currently widely used in language-related tasks, such as translation or answering questions like ChatGPT.

As a size of the large language model continuously increases, computational cost required for training and inference of the large language model is also significantly increasing. As a size of a language model increases, a method of using multiple accelerators for computation is becoming more common. While a graphics processing unit (GPU) is efficiently used as an accelerator for training, there is no still efficient accelerator for inference.

Reference material includes Korean Patent Laid-Open Publication No. 10-2022-0041224.

SUMMARY

Example embodiments may provide an inference performance method and system as a network technique capable of effectively performing a multi-device-based operation.

Technical subjects of the present invention are not limited to the aforementioned technical subjects and still other technical subjects not described herein will be clearly understood by one of ordinary skill in the art from the following description.

According to an example embodiment, there is provided a multi-device-based inference performance system including a plurality of devices configured to map to partitions that separate a large language model (LLM) into columns of a matrix of each layer according to an intra-layer parallelism method, wherein each of the plurality of devices is implemented to synchronize data by sharing a sub-result of matrix multiplication on the data with another device of the plurality of devices while the matrix multiplication is being performed.

According to an aspect, each of the plurality of devices may include a matrix processing unit configured to perform matrix multiplication on data; a sub-result storage configured to store, in a memory, a first sub-result that is calculated in real time by the matrix processing unit while the matrix multiplication is being performed; a transmitter configured to read the first sub-result stored in the memory and to transmit the same to at least one another device included in the inference performance system while the matrix multiplication is being performed; a receiver configured to receive a second sub-result calculated by each of the at least one other device from the at least one other device and to store the same in the memory; and a synchronizer configured to synchronize data using the first sub-result and the second sub-result while the matrix multiplication is being performed.

According to another aspect, performance of the matrix multiplication, transmission of the first sub-result, and reception of the second sub-result may be implemented to be simultaneously performed.

According to still another aspect, the matrix processing unit may continuously calculate matrix multiplication between an input vector and each column of a weight matrix, and the first sub-result may be generated for each matrix multiplication between the input vector each column.

According to still another aspect, the synchronizer may load the first sub-result and the second sub-result to the register file and may synchronize data.

According to an example embodiment, there is provided a device included in a multi-device-based inference performance system, the device including a matrix processing unit configured to perform matrix multiplication on data; a sub-result storage configured to store, in a memory, a first sub-result that is calculated in real time by the matrix processing unit while the matrix multiplication is being performed; a transmitter configured to read the first sub-result stored in the memory and to transmit the same to at least one another device included in the inference performance system while the matrix multiplication is being performed; a receiver configured to receive a second sub-result calculated by each of the at least one other device from the at least one other device and to store the same in the memory; and a synchronizer configured to synchronize data using the first sub-result and the second sub-result while the matrix multiplication is being performed.

According to an example embodiment, there is provided an inference performance method of a device included in a multi-device-based inference performance system, the inference performance method including performing matrix multiplication on data, wherein the performing of the matrix multiplication includes storing, in a memory, a first sub-result that is calculated in real time while the matrix multiplication is being performed; reading the first sub-result stored in the memory and transmitting the same to at least one another device included in the inference performance system while the matrix multiplication is being performed; receiving a second sub-result calculated by each of the at least one other device from the at least one other device and storing the same in the memory; and synchronizing data using the first sub-result and the second sub-result while the matrix multiplication is being performed, Specific details of other example embodiments are included in the detailed description and drawings.

According to some example embodiments, it is possible to provide an inference performance method and system as a network technique capable of effectively performing a multi-device-based operation.

According to some example embodiment, it is possible to reduce communication overhead and latency and to provide very high scalability for an inference performance system by simultaneously performing matrix multiplication and All-Gather.

Effects of the present invention are not limited to the aforementioned effects and still other effects not described herein will be clearly understood by one of ordinary skill in the art from the following description.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
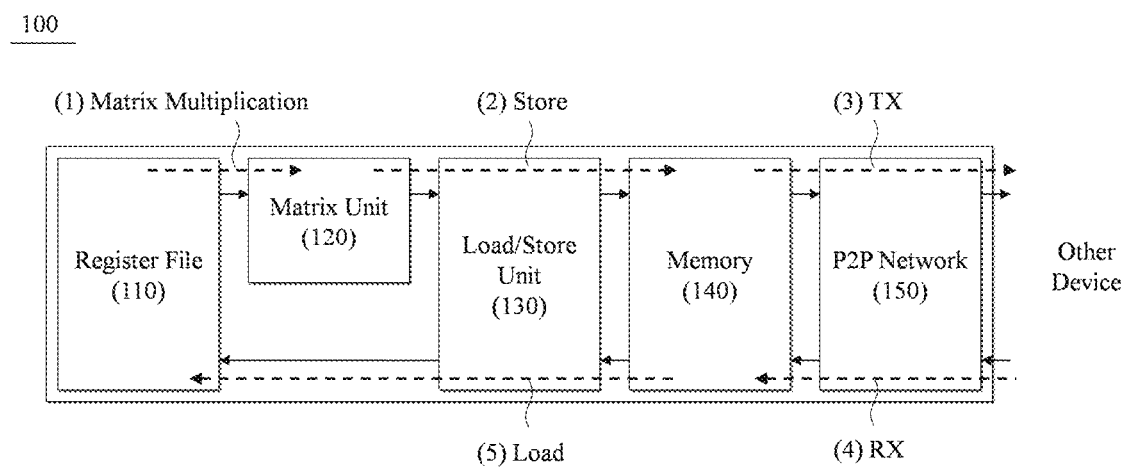
FIG. 1 illustrates an example of a hardware structure of a multi-device that implements an inference performance system according to an example embodiment.

Advantages and features of the present invention and methods to achieve the same will become clear with reference to example embodiments described in detail along with the accompanying drawings. However, the present invention is not limited to example embodiments disclosed blow and may be implemented in various forms. Here, the example embodiments are provided to make the disclosure of the present invention complete and to fully inform one of ordinary skill in the art to which the present invention pertains of the scope of the present invention and the present invention is defined by the scope of the claims. Like reference numerals used herein refer to like elements throughout.

When it is described that one component is "connected to" or "coupled to" another component, it may be understood that the one component is directly connected to or coupled to the other component or that still other component is interposed between the two components. In contrast, it should be noted that when it is described that one component is "directly connected to" or "directly coupled to" to another component, still other component may not be present therebetween. As used herein, the expression "and/or" includes any one and any combination of the associated listed items.

The terms used herein are to explain the example embodiments and not to be limiting of the present invention. Herein, the singular forms "a," "an," and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, and/or elements.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present invention.

Unless otherwise defined herein, all terms used herein (including technical or scientific terms) have the same meanings as those generally understood by one of ordinary skill in the art. Also, terms defined in dictionaries generally used should be construed to have meanings matching contextual meanings in the related art and are not to be construed as an ideal or excessively formal meaning unless otherwise defined herein.

In a training process for a large language model (LLM), an input amount and a computational amount are large, so a multi-device-based operation may be efficiently processed using a graphics processing unit (GPU) capable of well processing a throughput calculation. In contrast, in an inference process, an input amount is small and a lot of memory access is required, so performing a multi-device-based operation using the GPU degrades the efficiency.

For example, for training and inference, fundamentally different types of communication operation are required and operational characteristics are different. Accordingly, optimal solutions are also different. Training is a large batch operation with a large input amount and inference is a small batch operation with a small input amount. While multi-device-based training requires four types of communication operation, 1) Reduce Scatter, 2) All-Gather, 3) All Reduce, and 4) All-to-All, inference requires only one type of communication operation, All-Gather. Therefore, a solution for training may be applied to inference, but performance is degraded compared to a solution for inference.

Also, to operate inference of the large language model requires based on a multi-device, parallelism is required. Types of parallelism are largely divided into data parallelism and model parallelism. The data parallelism refers to a method of mapping the same model to all devices and then separating input and transmitting the same to each device, without separating a model. The model parallelism refers to a method of separating a model and mapping the same to each device. The model parallelism is divided again into inter-layer parallelism and intra-layer parallelism. The inter-layer parallelism is also called pipeline parallelism and is a method of separating a model based on a layer unit without separating a layer of the model. This may reduce a size of the model mapped to each device and may improve computational throughput, but may not reduce latency for a single request. On the contrary, the intra-layer parallelism refers to a method of separating each layer. This is a method that may improve throughput and also reduce latency, but separates each layer, which requires communication between devices after calculation in each device.

Example embodiments provide an inference performance method and system as a network technique capable of effectively performing a multi-device-based operation.

FIG. 1 illustrates an example of a hardware structure of a multi-device that implements an inference performance system according to an example embodiment. A device 100 according to an example embodiment shown in FIG. 1 may include a register file 110, a matrix unit 120, a load/store unit 130, a memory 140, and a peer-to-peer (P2P) network 150. Here, each multi-device that implements the inference performance system may have a hardware structure identical or similar to the device 100 of FIG. 1.

A process of (1) matrix multiplication may be an example of a process in which the device 100 reads data of the register file 110 and performs matrix multiplication on the data through the matrix unit 120.

A process of (2) store may be an example of a process in which the device 100 stores a sub-result in the memory 140 through the load/store unit 130 to transmit sub-results to a network without waiting the entire operation result of matrix multiplication.

A process of (3) TX (transmission) may be a process in which the device 100 reads the sub-result stored in the memory 140 from the memory 140 and transmits the same to the other device through the P2P network 150.

A process of (4) RX (reception) may be an example of a process in which the device 100 all-gathers data (sub-results) transmitted from each multi-device and stores the same in the memory 140. Even in this case, the device 100 may immediately store the sub-results in the memory 140 without waiting for all the data of the multi-device.

A process of (5) load may be an example in which the device 100 reads the sub-results stored in the memory 140 in the process of (4) from the memory 140 and writes back the same to the register file 110. Here, the sub-results to be written back to the register file 110 may also include the sub-result stored in the memory 140 in the process of (2), that is, the sub-result of matrix multiplication performed by the device 100.

Figure 2:
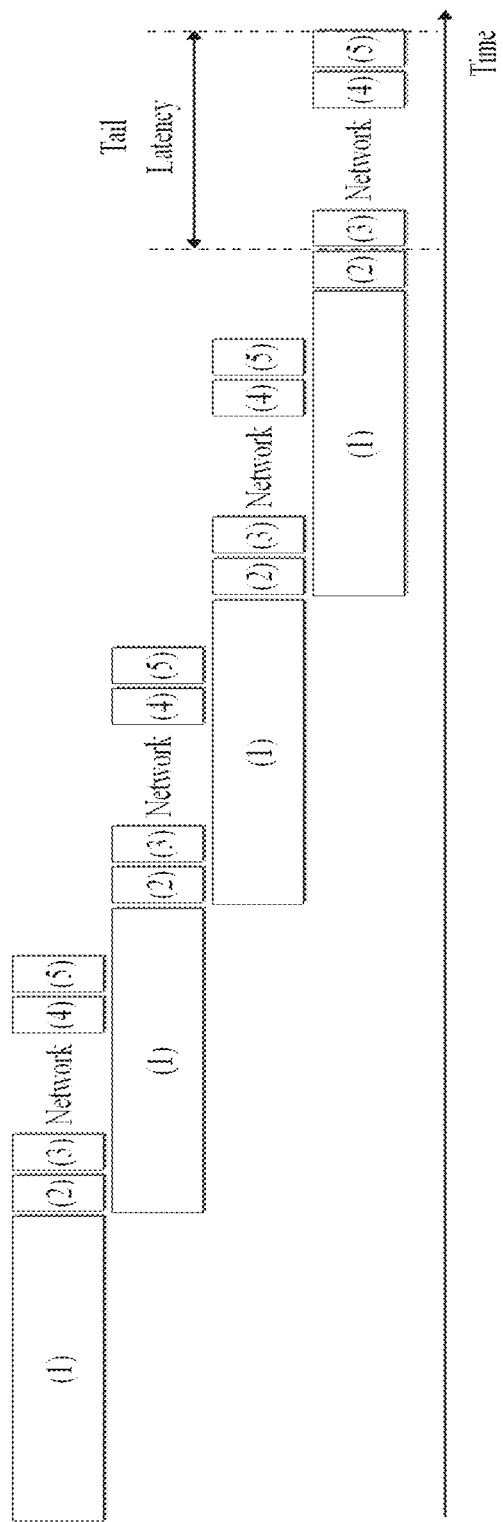
FIG. 2 illustrates an example of a timeline of an operation process of matrix multiplication using a multi-device according to an example embodiment.

FIG. 2 illustrates an example of a timeline of an operation process of matrix multiplication using a multi-device according to an example embodiment. As shown in the example embodiment of FIG. 2, the device 100 may substantially reduce communication overhead by processing the processes of (1) to (5) in a continuously pipelined manner, and may reduce latency excluding tail latency for the last operation result. This tail latency is very small and, as a result, the inference performance system according to the example embodiment may provide very high scalability.

Figure 3:
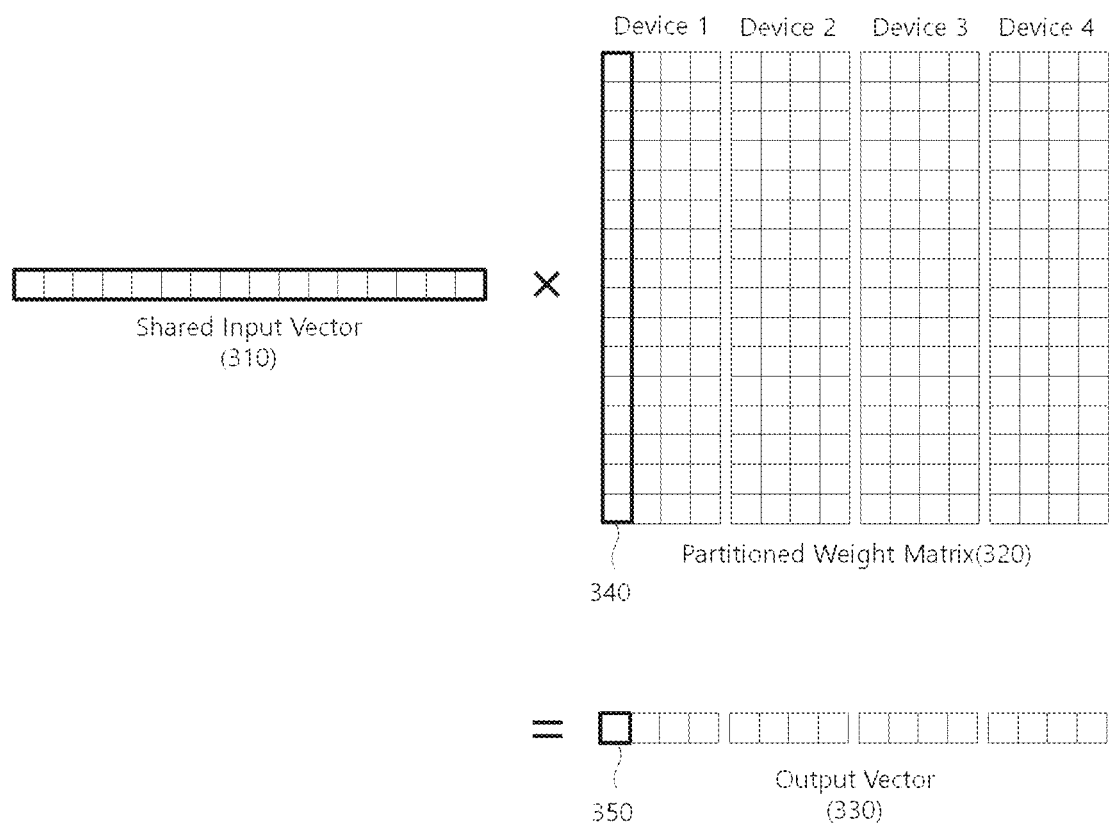
FIG. 3 illustrates an example of a sub-result in intra-layer parallelism according to an example embodiment.

FIG. 3 illustrates an example of a sub-result in intra-layer parallelism according to an example embodiment. The example embodiment of FIG. 3 shows an example of an output vector 330 generated as a result of matrix multiplication between a shared input vector 310 and a partitioned weight matrix 320. Here, each multi-device (e.g., each of device 1 to device 4) included in the inference performance system according to the example embodiment may perform matrix multiplication between each partition of the partitioned weight matrix 320 and the shared input vector 310 for intra-layer parallelism. Here, a first sub-result 350 may be generated as a result of device 1 performing matrix multiplication between a first column 340 of the partitioned weight matrix 320 and the shared input vector 310. Here, device 1 may transmit the earlier generated first sub-result 350 to each multi-device without waiting for a result of the entire partitioned weight matrix 320 or a result of the corresponding entire partition. That is, each device of the inference performance system according to the example embodiment may simultaneously perform matrix multiplication and All-Gather while transmitting data according to the sub-result to another device in real time, without waiting for the matrix multiplication to be completed.

To this end, instruction fusion may be required. For example, a matrix multiplication instruction and an All-Gather instruction may be fused. Also, architecture capable of supporting the instruction fusion is required. That is, a structure capable of simultaneously performing transmission for matrix multiplication and All-Gather is required. Also, the device needs to be capable of simultaneously processing reception. That is, each multi-device included in the inference performance system may have a structure that allows partitioned matrix multiplication, data transmission, and data reception to be simultaneously performed in real time.

Figure 4:
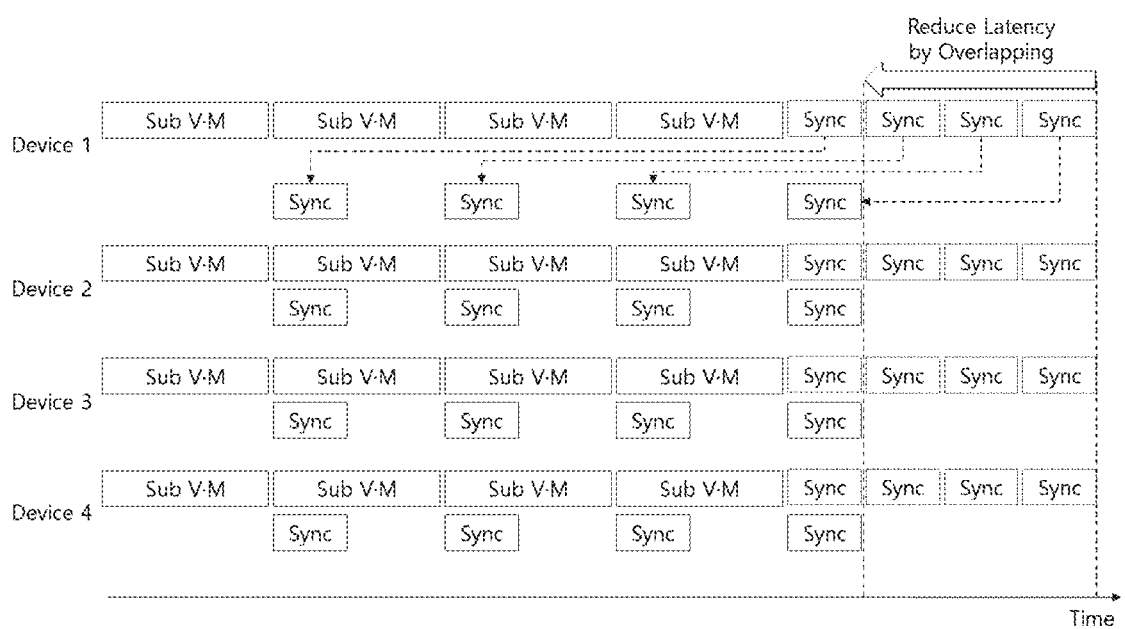
FIG. 4 illustrates an example of processing data synchronization through overlapping when processing an operation of matrix multiplication using a multi-device according to an example embodiment.

FIG. 4 illustrates an example of processing data synchronization through overlapping when processing an operation of matrix multiplication using a multi-device according to an example embodiment. A method of effectively performing partitioned matrix multiplication and subsequent necessary data synchronization is most important when performing a multi-device-based inference operation. In general, a processor may start All-Gather after matrix multiplication is completed. That is, since target data of matrix multiplication that is a first instruction is source data of All-Gather that is a second instruction, All-Gather may be executed after the matrix multiplication is completed due to a dependency check logic. The example embodiment of FIG. 4 shows latency in the case of performing data synchronization (e.g., data synchronization through All-Gather) after an operation of matrix multiplication is completed in a timeline and latency in the case of processing data synchronization by overlapping matrix multiplication. The inference performance system according to the example embodiment may simultaneously perform matrix multiplication and All-Gather while transmitting data of the sub-result from each multi-device to another device, without waiting for the matrix multiplication to be completed, and may significantly reduce latency through this overlapping. For example, it can be easily understood that the greater latency decrease effect may be achieved according to an increase in the size of the partitioned weight matrix 320 of FIG. 3.

Figure 5:
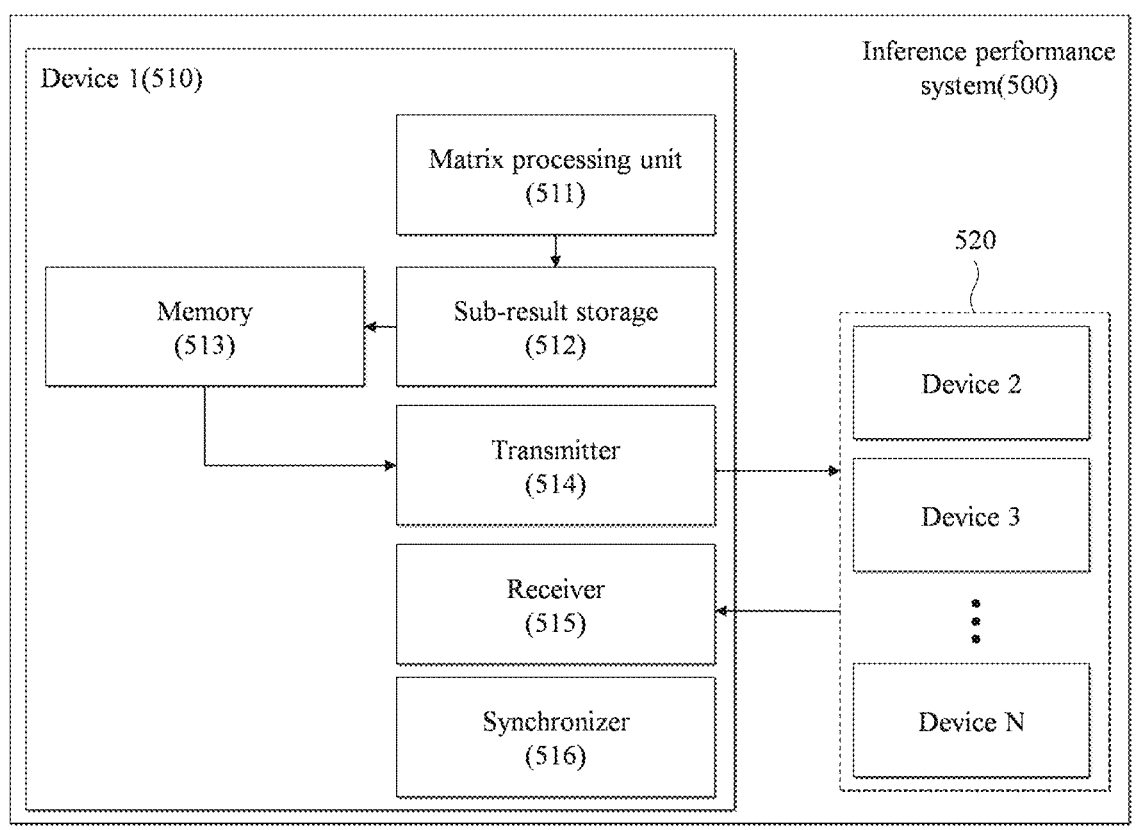
FIG. 5 is a diagram illustrating an example of an internal configuration of an inference performance system according to an example embodiment.
Figure 6:
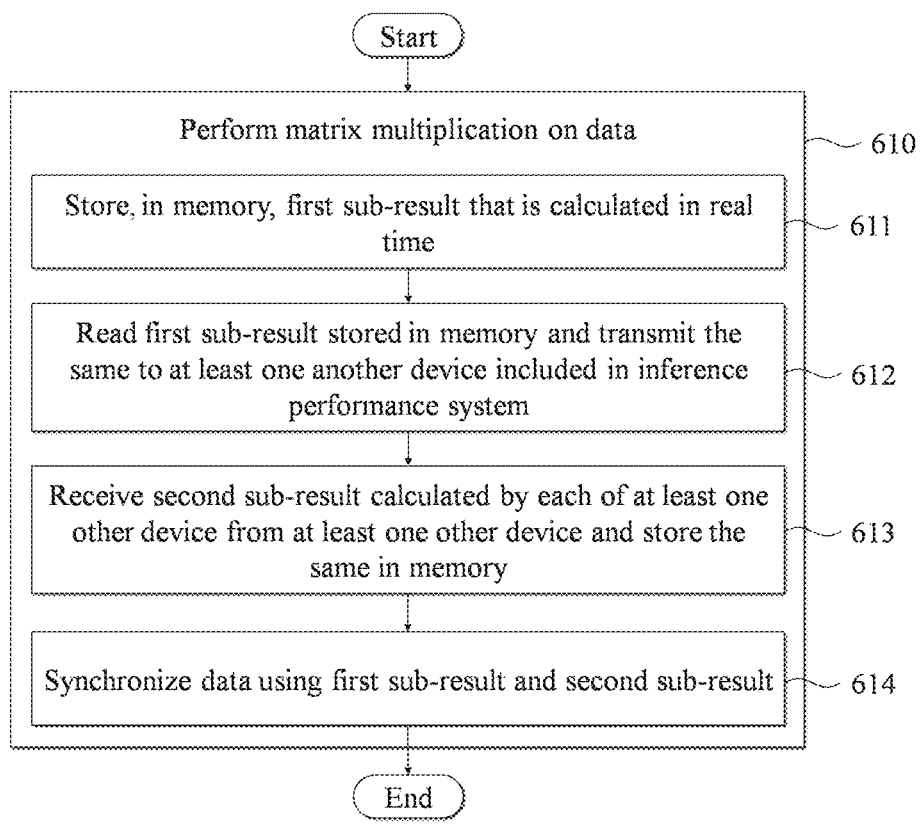
FIG. 6 is a flowchart illustrating an example of an inference performance method according to an example embodiment.

FIG. 5 is a diagram illustrating an example of an internal configuration of an inference performance system according to an example embodiment, and FIG. 6 is a flowchart illustrating an example of an inference performance method according to an example embodiment.

An inference performance system 500 according to an example embodiment shown in FIG. 5 may include a plurality of devices (device 1 510 and other devices 520) mapped to partitions that separate a large language model into columns of a matrix of each layer according to an intra-layer parallelism method. In this case, the inference performance system 500 may process inference using the large language model through the plurality of devices 510 and 520 that are mapped to the partitions of the large language model.

Here, referring to FIG. 5, the device 1 510 may include a matrix processing unit 511, a sub-result storage 512, a memory 513, a transmitter 514, a receiver 515, and a synchronizer 516. Here, the matrix processing unit 511, the sub-result storage 512, the transmitter 514, the receiver 515, and the synchronizer 516 may be functional representations for an operation of a physical processor includable in the device 1 510. Each of the other devices 520 may include components identical or similar to those of the device 1 510.

The inference performance method of FIG. 6 may include operation 610, and operation 610 may include operation 611 to operation 614.

In operation 610, the matrix processing unit 511 may perform matrix multiplication on data. For example, the matrix processing unit 511 may continuously calculate matrix multiplication between an input vector and each column of a weight matrix and may continuously generate a first sub-result for each matrix multiplication between the input vector and each column. In this case, operation 611 to operation 614 may be performed while the matrix multiplication is being performed in operation 610.

In operation 611, the sub-result storage 512 may store, in the memory 513, the first sub-result that is calculated in real time. For example, assuming that the matrix processing unit 511 calculates four sub-results from a (1-1)-th sub-result to a (1-4)-th sub-result, the (1-1)-th sub-result may be stored in the memory 513 during a process of calculating the (1-2)-th sub-result and the (1-2)-th sub-result may be stored in the memory 513 during a process of calculating the (1-3)-th sub-result. Even in the following operation 612 to operation 614, each sub-result may be also processed during a process of calculating a subsequent sub-result.

In operation 612, the transmitter 514 may read the first sub-result stored in the memory 513 and may transmit the same to each of the other devices 520 included in the inference performance system 500. Here, each of the other devices 520 may calculate the second sub-result may transmit the same to each of other devices excluding the corresponding device itself while performing matrix multiplication.

In operation 613, the receiver 515 may receive the second sub-result calculated by each of the other devices 520 and may store the same in the memory 513. In this case, all of the first sub-result and the second sub-result may be stored in the memory 513. Depending on example embodiments, the transmitter 514 and the receiver 515 may also process a process of storing the first sub-result again in the memory 513 in association with the second sub-result.

In operation 614, the synchronizer 516 may synchronize the data using the first sub-result and the second sub-result. For example, the synchronizer 516 may load the first sub-result and the second sub-result to the register file and may synchronize the data.

As described above, according to example embodiments, it is possible to provide an inference performance method and system as a network technique capable of effectively performing a multi-device-based operation. Also, it is possible to reduce communication overhead and latency and to provide very high scalability for an inference performance system by simultaneously performing matrix multiplication and All-Gather.

Although the example embodiments are described above with reference to the accompanying drawings, it will be understood by one of ordinary skill in the art that the present invention can be implemented in other specific forms without changing technical spirit or essential features of the invention. Therefore, the example embodiments should be understood in all respects as illustrative and not construed as limiting.

What is claimed is:

1. A device included in a multi-device-based inference performance system, the device comprising:
   a matrix processing unit configured to perform matrix multiplication on data;
   a sub-result storage configured to store, in a memory, a first sub-result that is calculated in real time by the matrix processing unit while the matrix multiplication is being performed;
   a transmitter configured to read the first sub-result stored in the memory and to transmit the same to at least one another device included in the inference performance system while the matrix multiplication is being performed;
   a receiver configured to receive a second sub-result calculated by each of the at least one other device from the at least one other device and to store the same in the memory; and
   a synchronizer configured to synchronize data using the first sub-result and the second sub-result while the matrix multiplication is being performed,
   wherein performance of the matrix multiplication, transmission of the first sub-result, and reception of the second sub-result is implemented to be simultaneously performed.

2. The device of claim 1, wherein the multi-device is mapped to partitions that separate a large language model (LLM) according to an intra-layer parallelism method, and
   the inference performance system processes inference using the large language model through the multi-device mapped to the partitions.

3. The device of claim 1, wherein the matrix processing unit continuously calculates matrix multiplication between an input vector and each column of a weight matrix stored in a register file, and
   the first sub-result is generated for each matrix multiplication between the each column and the input vector.

4. The device of claim 3, wherein the synchronizer loads the first sub-result and the second sub-result to the register file and synchronizes data.

5. An inference performance method of a device included in a multi-device-based inference performance system, the inference performance method comprising:
   performing matrix multiplication on data,
   wherein the performing of the matrix multiplication comprises:
   storing, in a memory, a first sub-result that is calculated in real time while the matrix multiplication is being performed;
   reading the first sub-result stored in the memory and transmitting the same to at least one another device included in the inference performance system while the matrix multiplication is being performed;
   receiving a second sub-result calculated by each of the at least one other device from the at least one other device and storing the same in the memory; and
   synchronizing data using the first sub-result and the second sub-result while the matrix multiplication is being performed,
   wherein the device is implemented to simultaneously perform performance of the matrix multiplication, transmission of the first sub-result, and reception of the second sub-result.

6. The inference performance method of claim 5, wherein the multi-device is mapped to partitions that separate a large language model (LLM) according to an intra-layer parallelism method, and
   the inference performance system processes inference using the large language model through the multi-device mapped to the partitions.

7. The inference performance method of claim 5, wherein the performing of the matrix multiplication further comprises continuously calculating matrix multiplication between an input vector and each column of a weight matrix stored in a register file, and generating the first sub-result for each matrix multiplication between the each column and the input vector.

8. The inference performance method of claim 7, wherein the synchronizing comprises loading the first sub-result and the second sub-result to the register file and synchronizing data while the matrix multiplication is being performed.

9. A multi-device-based inference performance system comprising:
   a plurality of devices configured to map to partitions that separate a large language model (LLM) according to an intra-layer parallelism method,
   wherein each of the plurality of devices is implemented to synchronize data by sharing a sub-result of matrix multiplication on the data with another device of the plurality of devices while the matrix multiplication is being performed;

wherein each of the plurality of devices comprises:

a matrix processing unit configured to perform matrix multiplication on data;

a sub-result storage configured to store, in a memory, a first sub-result that is calculated in real time by the matrix processing unit while the matrix multiplication is being performed;

a transmitter configured to read the first sub-result stored in the memory and to transmit the same to at least one another device included in the inference performance system while the matrix multiplication is being performed;

a receiver configured to receive a second sub-result calculated by each of the at least one other device from the at least one other device and to store the same in the memory; and a synchronizer configured to synchronize data using the first sub-result and the second sub-result while the matrix multiplication is being performed.

10. The inference performance system of claim 9, wherein performance of the matrix multiplication, transmission of the first sub-result, and reception of the second sub-result is implemented to be simultaneously performed.

11. The inference performance system of claim 9, wherein the matrix processing unit continuously calculates matrix multiplication between an input vector and each column of a weight matrix stored in a register file, and the first sub-result is generated for each matrix multiplication between the each column and the input vector.

12. The inference performance system of claim 11, wherein the synchronizer loads the first sub-result and the second sub-result to the register file and synchronizes data.

* * * * *